United States Patent [19]

Anagnostopoulos

[11] Patent Number: 5,027,148
[45] Date of Patent: Jun. 25, 1991

[54] AUTOFOCUS CHIP WITH REFERENCE LEVEL DETERMINATION CIRCUIT

[75] Inventor: Constantine N. Anagnostopoulos, Mendon, N.Y.

[73] Assignee: Eastman Kodak Company, Rochester, N.Y.

[21] Appl. No.: 566,207

[22] Filed: Aug. 13, 1990

[51] Int. Cl.$^5$ .............................................. G03B 13/00
[52] U.S. Cl. ................................ 354/402; 358/213.16
[58] Field of Search ................................ 354/400–409; 358/213.11, 213.15, 213.16, 213.19, 212

[56] References Cited

U.S. PATENT DOCUMENTS

| Re. 32,886 | 3/1989 | Stauffer | 354/400 |
|---|---|---|---|
| 3,274,914 | 6/1964 | Biedermann et al. | 354/405 |
| 4,490,036 | 12/1984 | Anagnostopoulos | 354/403 |
| 4,584,704 | 4/1986 | Ferren | 354/400 |
| 4,768,052 | 8/1988 | Hamada et al. | 354/402 |
| 4,831,405 | 5/1989 | Hata et al. | 354/409 |
| 4,873,543 | 10/1989 | Matsuzaki et al. | 354/402 |
| 4,878,079 | 10/1989 | Hamada et al. | 354/402 |
| 4,975,777 | 12/1990 | Lee et al. | 358/213.19 |

OTHER PUBLICATIONS

M. H. White, D. R. Lampe, F. C. Blaha, I. A. Mack, "Characterization of Surface Channel CCD Image Arrays at Low Light Levels", *IEEE Journal of Solid-State Circuits*, vol. SC-9, No 1, Feb. 1974, pp. 1–13.
Adib R. Hamade & Eugene Campbell, "Session XIII: Analog to Digital Conversion", *IEEE International Solid-State Circuits Conference*, 1976, pp. 154 and 155.
Principle and Technology of Fuji Autofocus-IC, Jul. 1987, Fuji Electric Co., Ltd.

Primary Examiner—L. T. Hix
Assistant Examiner—David M. Gray
Attorney, Agent, or Firm—Edward Dugas

[57] ABSTRACT

The present invention is an autofocus chip which produces reference levels or voltages from CCD charge sources rather from voltage sources chip. The CCD sensor of the chip has normal photodiodes and bright diodes. A high voltage reference is produced from the maximum charge or full well level of one of the bright diodes of the sensor, stored and used as the high reference of an A/D converter in the chip. The reference traverses the same path as the image values produced by the photodiodes. A low voltage reference for the A/D converter is produced by storing the reset level voltage of the bright diode or of each pixel. Correlated double sampling for each pixel is accomplished when the low reference level in the A/D converter is updated with the reset value of each pixel. The reset level also traverses the same path as the image signals. By setting the high reference level each time the chip is enabled and the low reference level for each pixel, the reference levels are adapted to the environmental changes experienced by the chip or to changes due to manufacturing tolerances. The bright diode level is used to determine the integration time for the sensor during an autofocus operation by comparing the charge in the bright diode with the photodiode having the largest charge.

9 Claims, 1 Drawing Sheet

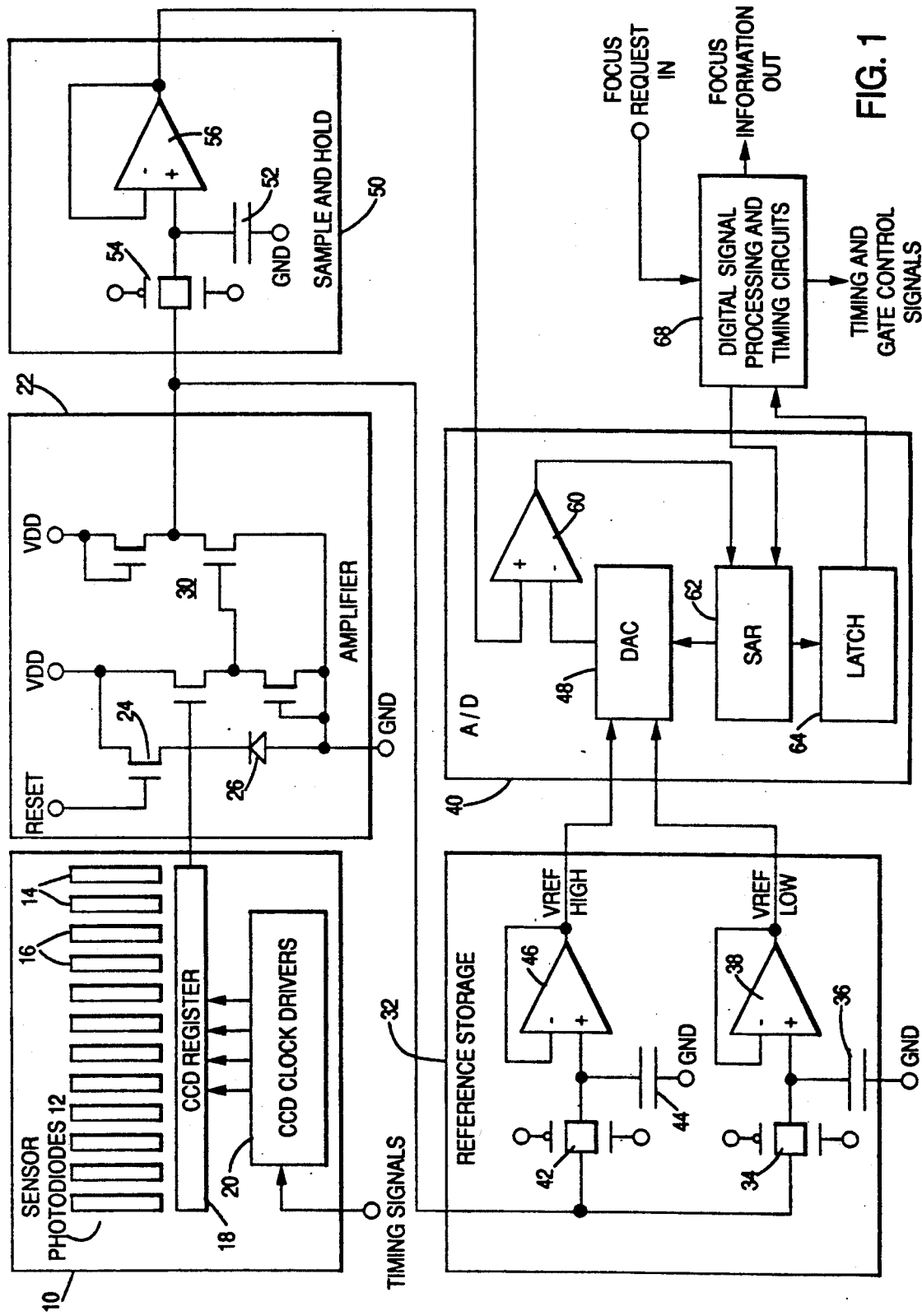

5,027,148

AUTOFOCUS CHIP WITH REFERENCE LEVEL DETERMINATION CIRCUIT

BACKGROUND OF THE INVENTION

1. Field of the Invention

The present invention is directed to a correlation type autofocus chip for a camera which provides reference levels for a conversion operation from within the chip and, more particularly, to a system which uses a full well signal from bright diodes of a charge coupled device (CCD) sensor to set a high reference level and the reset level experienced by the sensor as the low reference level for the conversion operation.

2. Description of the Related Art

Correlation type autofocus systems require a linear sensor, a method of sensing the light level in the scene and means of correlating the image falling on the left hand of the image sensor to that falling on the right half. Typically the signal from each pixel of the sensor is digitized to allow the correlation to be performed in the digital domain, either by on-chip signal processing circuitry or the on-camera microprocessor. Examples of correlation type autofocus systems are the Fuji Electric Company LTD part#FB6206 and those described in U.S. Pat. Nos. Re 32,886, 4,831,405, 4,873,543 and 4,878,079. These types of autofocus systems are passive systems which means that they depend on the light in the scene for their operation. Since the scene light level is not known before hand, the system must measure the light level and adjust the integration time to produce an adequate signal level. For a maximum signal to noise ratio it is necessary to know very accurately the full well signal level (the electron saturation level) that a CCD linear sensor can produce. During operation of the conventional autofocus system, the signal charge, in the form of electrons stored in the photodiodes, is transferred to a storage register, clocked out of the storage register, converted into a voltage and the voltage is applied to the converter to produce a digital value for the light sensed by the diodes. In this conventional circuit the high and low voltage references provided to the D/A converter are supplied from an external source, typically the voltage reference from a microprocessor that performs the correlation processing. In the Fuji chip previously discussed, the reference is determined by counting. In all cases, however, each camera must be individually calibrated. These voltage sources provide voltages independent of any changes that take place in the chip. For example, as a camera moves from indoors to outdoors, temperature fluctuations occur which change the characteristics not only of the photodiodes but also of the amplifiers, etc. that convert the charge into a voltage and apply it to the converter. The manufacturing process also results in variations. All of these variations result in only an approximation of the full well level and a variation around 1 volt being supplied to the converter. These reference voltage variations cause variations in the converted values such as producing a different converted value when the light conditions are the same because the chip has experienced an environmental change. As a result, the photographic media would normally experience differences in the precision of the focus from picture to picture. In conventional cameras, digital signal processing routines are used to attempt to correct for these variations. As described in U.S. Patent No. 4,831,405 the CCD output is measured and a microprocessor adjusts amplifier gain to perform such a correction.

SUMMARY OF THE INVENTION

It is an object of the present invention to provide an autofocus chip with the ability to determine its own reference levels for conversion in a variety of environments.

It is a further object of the present invention to remove the need for digital signal processing routines designed to correct for variations caused by relative fluctuations in reference levels.

It is also an object of the present invention to improve imaging by removing signal variations caused by environmental factors.

It is another object to set the reference levels for the conversion operation to their optimal values.

The above objects can be attained by a system which produces reference levels or voltages from sensor and amplifier charge levels rather from sources off the chip. A high voltage reference level is produced from the maximum charge or full well level of unused bright diodes of the CCD sensor and used as the high reference of an A/D converter in the autofocus chip. A low voltage reference is produced by storing the reset level voltage experienced by a preamplifier as the low reference voltage of the A/D converter. By setting these reference levels each time the circuit is activated, that is, each time a picture is taken, the reference levels are adapted to the environmental changes experienced by the autofocus chip.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 illustrates the components of a single integrated circuit chip in accordance with the present invention.

DESCRIPTION OF THE PREFERRED EMBODIMENTS

In the linear autofocus sensor 10 of the chip in accordance with the present invention, photodiodes 12 are used as the light sensing elements. In conventional sensors, extra non-light sensitive diodes are incorporated in the front and back of the sensor to shield the remaining diodes from any edge effects. These diodes are conventionally called dark diodes. In the present invention the first two (the front) diodes are converted into bright diodes. Of course, three or more could be used if edge effects of the sensor need to be compensated. The bright diodes 14 are followed by the conventional dark diodes 16. The bright diodes are identical to the other diodes except that they are not photosensitive and not reset, and thus produce a full well signal, that is, produce a charge that is the maximum, because of the way they are clocked. Separate clock signals for the transfer gates associated with the bright diodes 14 are provided to be able to produce a full well signal. Before the chip and thereby the sensor 10 is activated the non-photosensitive bright diodes 14 are full of electrons. After the chip is activated the light sensitive diodes 12 are reset by transferring the electrons in the diode 12 out through the CCD register 18. This is accomplished by opening a transfer gate between the photodiode and an integration storage gate or accumulation region and by opening a transfer gate between the charge accumulation region and the CCD register 18. The register 18 is then shifted out until it is empty. The cycle of opening the transfer gates and shifting the register is performed several times to empty the light sensitive diodes 12 and the accumulation region of electrons. During this reset cycle the bright diodes and the associated integration storage gate are not emptied which is accomplished by not opening the transfer gate between the CCD register 18 and the integration storage gate. To provide for this separate control function the connection for controlling the transfer gate between the register 18 and the accumulation region for the bright diodes is provided separate from the connection to the corresponding transfer gate of the light sensitive diodes 12 which all have this gate opened during the reset period. During the integration period the light striking the photosensitive diodes 12 generates electron-hole pairs with the electrons replenishing those taken out of the light sensitive diodes 12. As previously mentioned, the bright diodes 14 are not reset and thus the full electron reservoir of the bright diodes 14 is saved. In the photodiode layout, during integration the electrons captured by the photodiodes 12 are not stored in the photodiodes but instead are continuously transferred to the integration storage gate. Similarly, for the bright diodes 14, during integration the electrons in the diodes 14 are allowed to transfer to their corresponding integration storage gates. At the completion of the first integration time the electrons collected in each integration storage gate, including the bright diode storage gates, are transferred to the corresponding stage of the CCD register 18. A detailed description of the construction and operation of the photodiodes, (photosensitive 12, dark 16 and bright 14) including the various transfer gates and the storage gates can be found in U.S. application Ser. No. 366,843 by Lee and Erhardt entitled Charge-Coupled Imager With Dual Gate Anti-Blooming Structure filed June 15, 1989 incorporated by reference herein. As mentioned previously, by providing the separate clocking connection for the transfer gate adjacent the CCD register of the bright diodes 14 a conventional dark diode is converted into a bright diode. For testing, the operation of the bright diodes 14, additional separate connections are provided If a bright diode constructed in accordance with the U.S. application Ser. No. 366,843 is provided with separate clocking connections for overflow drains (anti-blooming drains) and overflow gates (transfer gates associated with the anti-blooming drains), the electrons in the nonphotosensitive bright diodes 14 can be replenished by applying an electron source to the overflow drains and clocking the overflow gates. This allows the bright diode to be tested. The dark diodes always produce an empty well signal level irrespective of the light level.

During normal operation of the sensor 10 as previously discussed all the diodes 12 and 16 except for the bright diodes 14, as well as, the contents a CCD register 18 are emptied of charge when the chip is enabled. When making a measurement of the charge in the photodiodes during an operation conventionally called correlated double sampling, a reset signal is applied to transistor 24 in the amplifier 22 causing a floating diffusion diode 26 to be charged to the reset level VDD. At the end of the integration cycle (the time allowed for light to strike the photodiodes before their charges are transferred) the electrons in each of the storage gates associated with the diodes, including the bright diodes, are transferred to the corresponding stage of the CCD register 18. CCD clock drivers 20 shift the stored charges out of the CCD register 18 one pixel at a time with the bright diodes 14 shifted out first. During this shifting operation the reset level established in diode 26, which is the low level signal, progresses through the preamplifier stage 28 and gain stage 30. The gain stage 30 together with the preamplifier stage 28 serves to invert the signal, level shift and amplify it, while maintaining linearity over the entire signal range. The reset level is transferred to a reference storage unit 32 through a switched transistor or transmission gate 34 and stored in a reset level capacitor 36, thereby sampling and holding the reset level. The transmission gate 34 and the other transmission gates discussed herein are conventional two phase devices that require two control signals, one for each direction of possible current flow. High input impedance, unity gain amplifier 38 produces the reset level voltage from the charge in capacitor 36 and supplies it to a low reference voltage input of A/D converter 40. The reset signal can be updated every time a CCD pixel is read out if desired.

The signal and reset levels associated with the first bright diode are discarded. When the signal from the second bright diode passes through the preamplifier 28 and gain stage 30, it is transferred through a switched transistor or transmission gate 42 and stored in a bright level capacitor 44. This voltage is then converted into the high reference voltage by buffer amplifier 46 and supplied to the high reference input of the converter 40. Of course, depending on the application, any of the output signal levels appearing at the output of the gain stage of any of the photodiodes, can be captured by either the bright 44 or reset 36 capacitors.

The two voltage references, the high and low, are applied to the upper and lower ends of the resistor string of the digital to analog converter 48 in the A/D converter 40. The difference between the low level supplied by buffer 38 and the high level supplied by buffer 46 is exactly equal to a full well signal and is independent of the charge capacity of the photosensors or the gains of the preamplifier and gain stages or other process variations or temperature or power supply variations. Each time the following normal photodiodes 12 are read out, the reset voltage level of each of the photodiodes can be stored in the reset capacitor 36, thus accomplishing correlated double sampling for noise reduction. The signals from the dark diodes 16 and normal photodiodes 12 are routed to the sample and hold circuit 50 and stored in the capacitor 52 by a switched transistor or transmission gate 54. The buffer amplifier 56 produces a signal which is applied to one input of a comparator 60 in the converter 40. The converter 40 is preferably a conventional successive approximation type A/D converter which causes a successive approximation register 62 to change the connection arrangement of the resistor string in the converter 48 until the voltage supplied to the comparator 60 from the converter 48 is as close as possible to the voltage supplied from buffer 50. When the successive approximation cycle is finished, the content of the register 62 is stored in latch 64 and output to conventional digital signal processing and timing circuits 68 of the autofocus chip.

Since the photodiodes 12 are constructed substantially identically to the bright diodes 14, except for clocking connection previously discussed, and since the signal path is substantially identical for both the bright voltage reference and the normal signal, the two signals, once the integration time is properly set, become exactly equal in the event that a normal photodiode 12 integrates to a full well capacity. The amplification paths for the reset level and the voltage reference bright level are also substantially identical. With identical paths any environmental changes in the chip, such as caused by temperature changes, will be the same for both paths, thereby nullifying the effects of such changes.

The voltage difference in the converter 48 between the high voltage reference and the low voltage reference is equal to a full well as previously discussed. This level difference is equal to a count of 256 when the highest count of the converter 40 is 256. When the signal from a photosensitive diode 12 is digitized, its count is somewhere between 0 and 256. The digital signal processing circuit 68, which normally is initialized with a nominal integration time between the maximum and zero, can easily calculate the integration time to produce a full well signal from the photodiode receiving the maximum light level once the first measurement of all photodiodes has been made. That is, the processing circuit 68 detects the largest signal from all the photodiodes 12, reads and compares it to the maximum possible signal which should have a digital count of 256, equal to the signal level of the bright diode. When the level of the highest diode is below the maximum level but not zero, it is a simple matter of calculating a linear change in the integration time to produce the maximum signal in the photodiode that has the largest signal, since the signal level is a linear function of integration time. The same procedure can be used to adjust the integration time based on the signal level of a group of photodiodes 12. If all the diodes are saturated the processing circuit lowers the integration time until only a single diode has the maximum charge. In the event that the signal read is zero for all photodiodes, then the integration time should be set to the maximum allowed for the chip and consideration must also be given to reading the light meter. In the event that the light meter is reading a low scene illumination, then the autofocus chip may not need to determine the focus. Once the integration time for a full well level signal is determined, the autofocus chip then performs the standard or conventional image correlation operations as discussed for example, in detail in U.S. Pat. No. 4,490,036 incorporated by reference herein.

In the previous discussion the charge in one of the bright diodes is used to set the high reference voltage for the converter 40 and the low reference voltage was set based on the level established in diode 26. It is possible to set the low voltage reference using the output of one of the dark diodes 16 in the same manner as the high reference voltage was set using the bright diodes 14. Further, the buffer amplifier 56 can be eliminated and the voltage from capacitor 52 could be provided directly to the comparator 60. However, if this amplifier 56 is eliminated the path of the bright diode signal is not identical to the paths of the reference voltages and therefore the space occupied by the chip can be reduced at some sacrifice in path equivalence.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A camera autofocus apparatus, comprising:
   a photodiode sensor having photodiodes and a full well diode, the full well diode providing a full well charge and the photodiodes providing image values;
   reference level storage means for storing a reference voltage equivalent to the full well charge;
   converter means for converting the image values to digital values based on the reference voltage; and
   autofocus means for performing image correlation operations responsive to the digital values.

2. An apparatus as recited in claim 1, wherein said autofocus means comprises digital timing and signal processing circuits and said sensor, reference level storage means, converter means and digital timing and signal processing circuits are formed on a single integrated circuit.

3. An apparatus as recited in claim 1, wherein said autofocus means determines sensor integration time by comparing the full well reference voltage to a voltage produced by the one of the photodiodes with the largest charge.

4. An apparatus as recited in claim 1, further comprising:
   amplifier means for providing a reset level and the reference voltage; and
   reset level storage means for storing the reset level and providing a reset level voltage to said converter means, said converter means providing the digital values responsive to both the reference voltage and the reset level voltage.

5. An apparatus as recited in claim 4, said amplifier providing the image values from image charges provided by said photodiodes, said apparatus further comprising image buffer means for storing the image values and providing the image values to said converter means.

6. A camera autofocus apparatus, comprising:
   photodiode sensor having a full well diode and photodiodes;
   an amplifier connected to said sensor;
   an image signal buffer connected to said amplifier;
   a reference storage circuit connected to said amplifier;
   an analog-to-digital converter connected to said buffer and said storage circuit; and
   an autofocus processing circuit connected to said sensor, amplifier, buffer, circuit and converter.

7. An apparatus as recited in claim 6,
   wherein said amplifier provides a reset level voltage to said reference storage after said sensor is reset, provides a reference voltage to said reference storage when said full well diode is clocked out and provides image voltages to said buffer when said photodiodes are clocked out,
   wherein said buffer comprises:
   a first transmission gate connected to said amplifier;
   a first capacitor connected to said first transmission gate and storing said image voltages; and a first buffer amplifier connected between said first capacitor and a signal input of said converter, and wherein said reference storage comprises:
- a second transmission gate connected to said amplifier;
- a second capacitor connected to said second transmission gate and storing said reference voltage;
- a second buffer amplifier connected between said second capacitor and a high reference voltage input of said converter;
- a third transmission gate connected to said amplifier;
- a third capacitor connected to said third transmission gate and storing said reset level voltage; and
- a third buffer amplifier connected between said third capacitor and a low reference voltage input of said converter.

8. A method of autofocus, comprising:
(a) determining reference levels for a conversion operation from a bright diode of a sensor and a reset voltage;
(b) performing conversions using the reference levels; and
(c) performing autofocus operations responsive to the conversions.

9. A method as recited in claim 8, wherein step (c) comprises determining an integration time from a charge level of a bright diode and a photodiode of the sensor having the maximum charge.

* * * * *